United States Patent [19]

Matsumoto

[11] Patent Number: 5,649,754
[45] Date of Patent: Jul. 22, 1997

[54] ILLUMINATING APPARATUS AND A METHOD OF MANUFACTURING AN EDGE LIGHT CONDUCTOR FOR USE THEREIN

[75] Inventor: Iwao Matsumoto, Toyonaka, Japan

[73] Assignee: Photo Craft Co., Ltd., Japan

[21] Appl. No.: 372,102

[22] Filed: Jan. 13, 1995

Related U.S. Application Data

[62] Division of Ser. No. 271,582, Jul. 7, 1994, Pat. No. 5,386,347, which is a continuation of Ser. No. 973,424, Nov. 9, 1992, abandoned.

[30] Foreign Application Priority Data

Nov. 2, 1992 [JP] Japan ................................. 4-265038
Nov. 2, 1992 [JP] Japan ................................. 4-265039

[51] Int. Cl.$^6$ ..................................................... F21V 8/00
[52] U.S. Cl. .................... 362/31; 362/27; 362/327; 362/330; 427/163.2; 427/163.4
[58] Field of Search ....................... 427/162, 163.2, 427/163.3, 163.4, 282, 290; 362/26, 27, 31, 327, 330, 333, 339; 40/546, 547, 582, 583; 359/48, 49; 385/129, 130

[56] References Cited

U.S. PATENT DOCUMENTS

| | | | |
|---|---|---|---|
| 1,364,916 | 1/1921 | Carse | 40/546 |
| 2,091,342 | 8/1937 | Van Bloem | 40/546 |
| 3,241,256 | 3/1966 | Viret et al. | 40/546 |
| 3,351,753 | 11/1967 | Berger | 362/327 |
| 4,373,282 | 2/1983 | Wragg | 40/546 |
| 4,460,940 | 7/1984 | Mori | 362/330 |
| 4,729,068 | 3/1988 | Ohe | 362/31 |
| 4,811,507 | 3/1989 | Blanchet | 40/546 |
| 4,914,553 | 4/1990 | Hamada et al. | 362/32 |
| 5,005,108 | 4/1991 | Pristash et al. | 362/31 |
| 5,079,675 | 1/1992 | Nakayama | 362/31 |
| 5,093,765 | 3/1992 | Kashima et al. | 362/31 |
| 5,128,842 | 7/1992 | Kenmochi | 362/95 |
| 5,134,549 | 7/1992 | Yokoyama | 362/31 |
| 5,136,480 | 8/1992 | Pristash et al. | 362/26 |
| 5,207,493 | 5/1993 | Murase et al. | 362/31 |

FOREIGN PATENT DOCUMENTS

| | | | |
|---|---|---|---|
| 40901 | 2/1989 | Japan | 427/162 |
| 2204725 | 11/1988 | United Kingdom | 40/582 |

OTHER PUBLICATIONS

Arnoult et al., IBM Technical Disclosure Bulleting, vol. 21, No. 7, Dec./1978, pp. 2703-2704.

*Primary Examiner*—Alan Cariaso
*Attorney, Agent, or Firm*—Webb Ziesenheim Bruening Logsdon Orkin & Hanson, P.C.

[57] ABSTRACT

An illuminating apparatus has a transparent or semitransparent optical medium in the form of an acrylic plate, two fluorescent tubes for emitting light into the acrylic plate through opposite end surfaces thereof, and a reflecting plate disposed under a lower surface of the acrylic plate for upwardly reflecting the light. The lower surface of the acrylic plate defines a diffusing plane including a plurality of irregular reflector regions distributed thereon. The irregular reflector regions comprise ship-shape patterns arranged in juxtaposition longitudinally of the fluorescent tubes. The diffusing plane further includes modified irregular reflector regions formed where the irregular reflector regions are absent. The modified irregular reflector regions irregularly reflect a less quantity of light than the irregular reflector regions.

17 Claims, 9 Drawing Sheets

(A)

(B)

ILLUMINATING APPARATUS AND A METHOD OF MANUFACTURING AN EDGE LIGHT CONDUCTOR FOR USE THEREIN

This is a divisional of application(s) Ser. No. 08/271,582 filed on Jul. 7, 1994, now U.S. Pat. No. 5,386,347 issued on Jan. 31, 1995 which was an FWC of application Ser. No. 07/973,424 filed Nov. 9, 1992, now abandoned.

BACKGROUND OF THE INVENTION

1. Field of the Invention

This invention relates to an illuminating apparatus and a method of manufacturing an edge light conductor for use therein. More particularly, the invention relates to an illuminating apparatus comprising an edge light conductor including a plate of transparent or semitransparent optical medium, and light sources opposed to end surfaces of the plate for introducing light inwardly of the plate through the end surfaces. The plate has at least one of front and back surfaces defining a diffusing plane including irregular reflector regions distributed over the diffusing plane. The invention relates also to a method of manufacturing the edge light conductor.

2. Description of the Related Art

This type of illuminating apparatus has a construction as shown in FIG. 12. A plate of transparent or semitransparent optical medium receives light beams b1, b2, b3 and b4 entering through an end surface 2. The plate A has a lower surface defining a diffusing plane 8 including irregular reflector regions 9a and 9b. The beams b1 and b2 are irregularly reflected from the irregular reflector regions 9a and 9b to exit the plate A to illuminate an object.

Light beams, e.g. beams b3 and b4, which do not hit the irregular reflector regions 9 impinge on the upper and lower surfaces of the plate A at incident angles θ not exceeding a critical angle θc, to be totally reflected. The incident angles are dependent on the angles at which the beams impinge on the end surface 2 and on the thickness of the plate A. As a result, these beams b3 and b4 continue traveling inside the plate A, instead of exiting the plate A, before reaching the irregular reflector regions 9.

The quantity of exiting light (i.e. illuminating intensity) per unit area of an illuminating plane of the illuminating apparatus is adjustable by varying areas of the irregular reflector regions per unit area of the diffusing plane 8.

The irregular reflector region 9b remote from the end surface 2 has a large irradiated area per unit source area because of a long distance from the light source L. In addition, the beam b2 reaches this irregular reflector region 9b after being considerably attenuated as it travels along an extended optical path through the plate A. Thus, the beam b2 impinges on a unit area of the irregular reflector region 9b in a ;smaller quantity than the beam b1 impinging on the unit area of the irregular reflector region 9a close to the end surface 2. Naturally, therefore, the irregular reflector region 9b provides a reduced quantity of irregular reflection per unit area.

In order for the illuminating apparatus to have a uniform illuminating intensity throughout the illuminating plane, the quantity of irregular reflection must be uniformed throughout unit areas of the diffusing plane 8.

A plate A in a conventional illuminating apparatus of this defines a diffusing plane 8 including irregular reflector regions 9 as shown in FIG. 13. The irregular reflector regions 9 are distributed such that the areas thereof occupying unit areas of the diffusing plane 8 are larger in positions 8b remote from end surfaces 2 of the plate A than in positions 8a close thereto.

According to the prior art noted above, it is necessary to secure large regions 13 of the diffusing plane 8 in the positions 8a close to the end surfaces 2 where no irregular reflector regions 9 are formed, in order that the irregular reflector regions 9 are larger in the positions 8b remote from the end surfaces 2 than the positions 8a close thereto. These regions 13 are left to be smooth and transparent regions producing little or no effect of irregular reflection.

Thus, the diffusing plane 8 produces the less total quantity of irregular reflection for the regions 13 where no irregular reflector regions 9 are formed. This results in the inconvenience that the illuminating apparatus becomes dark with the illuminating intensity reduced for uniformity. The conventional construction also has a disadvantage of failing to use the light from the light sources effectively.

In the prior art, the quantity of irregular reflection per unit area is adjusted by means of the irregular reflector regions and transparent regions. This inevitably results in lack of uniformity in illuminating intensity over the illuminating plane of the apparatus since the irregular reflector regions and transparent regions produce a great difference in illuminating intensity (contrast). Specifically, the patterns of the irregular reflector regions 9 distributed as shown in FIG. 13 appear on the illuminating plane of the apparatus.

SUMMARY OF THE INVENTION

The object of the present invention is to eliminate the disadvantages of the prior art noted above.

This object is fulfilled, according to the present invention, by an illuminating apparatus as noted in the outset hereof, in which the diffusing plane further includes modified irregular reflector regions formed in at least some of the parts thereof from which the irregular reflector regions are absent, the modified irregular reflector regions providing a less quantity of irregular reflection than the irregular reflector regions.

With the above construction in which modified irregular reflector regions are formed in the parts of the diffusing plane having no irregular reflector regions, the quantity of irregular reflection per unit area of the diffusing plane may be adjusted by varying a ratio between the irregular reflector regions and modified irregular reflector regions occupying the unit areas of the diffusing plane. At the same time, the light emitted from light sources is irregularly reflected by the modified irregular reflector regions also.

Since the modified irregular reflector regions also reflect the light traveling from the light sources, the illuminating intensity on the illuminating plane of the apparatus may be increased while the intensity per unit area of the illuminating plane is adjustable. The quantity of irregular reflection per unit area is adjusted by means of the irregular reflector regions and modified irregular reflector regions. The irregular reflector regions and modified irregular reflector regions have a smaller difference in illuminating intensity (contrast) than the irregular reflector regions and transparent regions. Thus, the quantity of irregular reflection may be adjusted with subtle variations in illuminating intensity. Consequently, the irregular reflector regions distributed over the diffusing plane are invisible on the illuminating plane of the apparatus.

Thus, the illuminating apparatus according to the present invention provides increased brightness and minimal unevenness in illuminating intensity on the illuminating plane though the same light sources as in the prior art are used.

In the illuminating apparatus according to the present invention, the irregular reflector regions may be formed on the diffusing plane such that a greater quantity of light is irregularly reflected from positions remote from the end surfaces than from positions close thereto.

With this arrangement, illuminating intensity may be uniformed throughout the diffusing plane. This apparatus provides increased brightness while uniforming illuminating intensity throughout the diffusing plane.

The irregular reflector regions and modified irregular reflector regions may comprise rugged surfaces formed on the plate.

With this construction, the irregular reflector regions and modified irregular reflector regions produce a greater effect of irregular reflection than in the prior art. In the prior art, the irregular reflector regions are formed by applying a hypochromatic white ink or milky paint mixed with glass beads or other diffusing materials, to a plate surface by a printing technique.

In the prior art, the irregular reflector regions are formed by applying ink or paint to a smooth plate surface. Since an interface between plate and ink or paint reflects a certain quantity of light, part of the light impinging on the irregular reflector regions is reflected by the interface to return inwardly of the plate without reaching the ink or paint. Consequently, a reduced quantity of light is irregularly reflected by the irregular reflector regions. The part of light reaching the ink or paint is attenuated through repeated irregular reflections within the layer of ink or paint. Further, the irregularly reflected light exiting the ink or paint may be blocked by pigments or diffuser particles present on optical paths. The effect of irregular reflection is impaired in this way. However, such an inconvenience is eliminated where the irregular reflector regions and modified irregular reflector regions are in the form of rugged surfaces, thereby to enhance the effect of irregular reflection.

Consequently, the illuminating apparatus according to the present invention provides increased brightness with the enhanced effect of irregular reflection produced by the irregular reflector regions and modified irregular reflector regions.

In a further aspect of the invention, a method of manufacturing an edge light conductor is provided which comprises the steps of shaping at least one of front and back surfaces of a plate of transparent or semitransparent optical medium to be a uniform rugged surface substantially throughout an entirety thereof, and forming modified irregular reflector regions by applying deposits to part of the rugged surface to limit a quantity of irregular reflection.

With this method, there is no need to form graphic patterns of the irregular reflector regions with great subtlety and ultra-high precision in the process of forming the rugged surface. The pans having the deposits act as the modified irregular reflector regions.

Thus, the present invention provides a method of easily and quickly manufacturing an edge light conductor having a high efficiency of irregular reflection and assuring bright edge light.

The parts having the deposits to act as the modified irregular reflector regions may retain a certain quantity of irregular reflection caused by the rugged surface lying underneath the deposits. With this arrangement, the modified irregular reflector regions may cause irregular reflection while the illuminating intensity of the edge light is adjustable by a distribution ratio between the irregular reflector regions and modified irregular reflector regions. Thus, the edge light conductor manufactured by this method provides an increased total quantity of irregular reflection to assure brightness.

The rugged surface may advantageously be formed by sand blasting.

In this way, the rugged surface may be formed substantially uniformly, simply and quickly over the entire or approximately entire surface of the plate for defining the irregular reflector regions.

The modified irregular reflector regions may be formed by applying transparent ink in a printing process to form the deposits.

With this method, the transparent ink applied to the rugged surface produces the same effect as water adhering to ground glass, to limit the quantity of irregular reflection from the rugged surface. Since transparent ink is applied by printing, very fine and accurate graphic patterns of the irregular reflector regions may be formed simply and quickly. Thus, this method is capable of simply and quickly manufacturing an edge light conductor that provides a precisely regulated illuminating intensity.

The transparent ink may be applied by a printing technique such as photographic printing using a photoresist or by silk screen printing, for example. Then, the transparent ink applied has an unsmooth surface as distinct from a smooth surface formed by a mirror die or mirror roller. In the case of silk screen printing, the surfaces of the transparent ink deposits have fine traces left by silk screen meshes, thereby defining rugged surfaces for causing a certain quantity of irregular reflection.

Thus, the modified irregular reflector regions may be formed simply by applying the transparent ink in a printing process.

Other features and advantages of the invention will be apparent from the following more particular description of preferred embodiments of the invention, as illustrated in the accompanying drawings.

DETAILED DESCRIPTION OF THE PREFERRED EMBODIMENTS

Illuminating apparatus according to the present invention will be described in detail with reference to the drawings.

Figure 1:
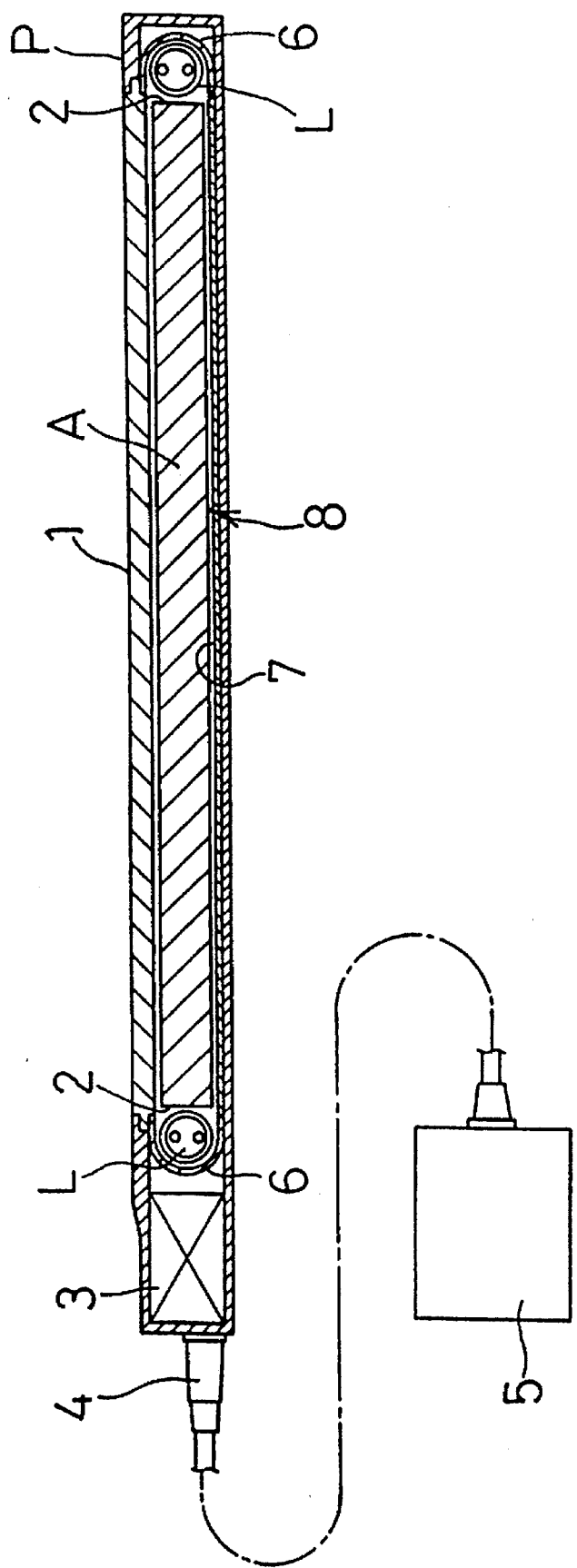
FIG. 1 is a view in vertical section of an ultra-thin light box according to the present invention.

FIG. 1 shows an edge light type ultra-thin light box in one embodiment of the present invention.

This ultra-thin light box comprises a casing P having an upper surface defining an illuminating plane. A positive photograph or film such as a slide photograph may be placed on the illuminating plane for observation by means of transmitted light.

A milky, semitransparent acrylic plate 1 is mounted on the illuminating plane of the casing P to act as an edge light conductor. Light emitted from the illuminating plane has a color temperature adjustable to 5,000 degrees, for example.

The casing P contains a transparent or semitransparent optical medium in the form of an acrylic plate A, two fluorescent tubes L acting as light sources for emitting light into the acrylic plate A through opposite end surfaces 2 thereof, and a circuit device 3 for lighting the fluorescent tubes L.

The fluorescent tubes L may be the cold cathode type or hot cathode type.

A battery 5 is connected to an outer position of the casing P through a pin jack 4 to supply power to the fluorescent tubes L.

Power may be derived also from a household AC outlet by using an AC adapter connected through the pin jack 4.

Each of the fluorescent tubes L has a reflector 6 attached thereto, whereby light emitted from each fluorescent tube L is all directed to the end surface 2 of the acrylic plate A. A reflecting plate 7 is disposed opposite a lower surface of the acrylic plate A. The reflecting plate 7 has an upper surface defining a mirror surface, whereby light emerging from the lower surface of the acrylic plate A is reflected toward the upper surface thereof. The acrylic plate A is disposed directly under: the illuminating plane, and the lower surface of the acrylic plate A defines a diffusing plane 8.

Figure 2:
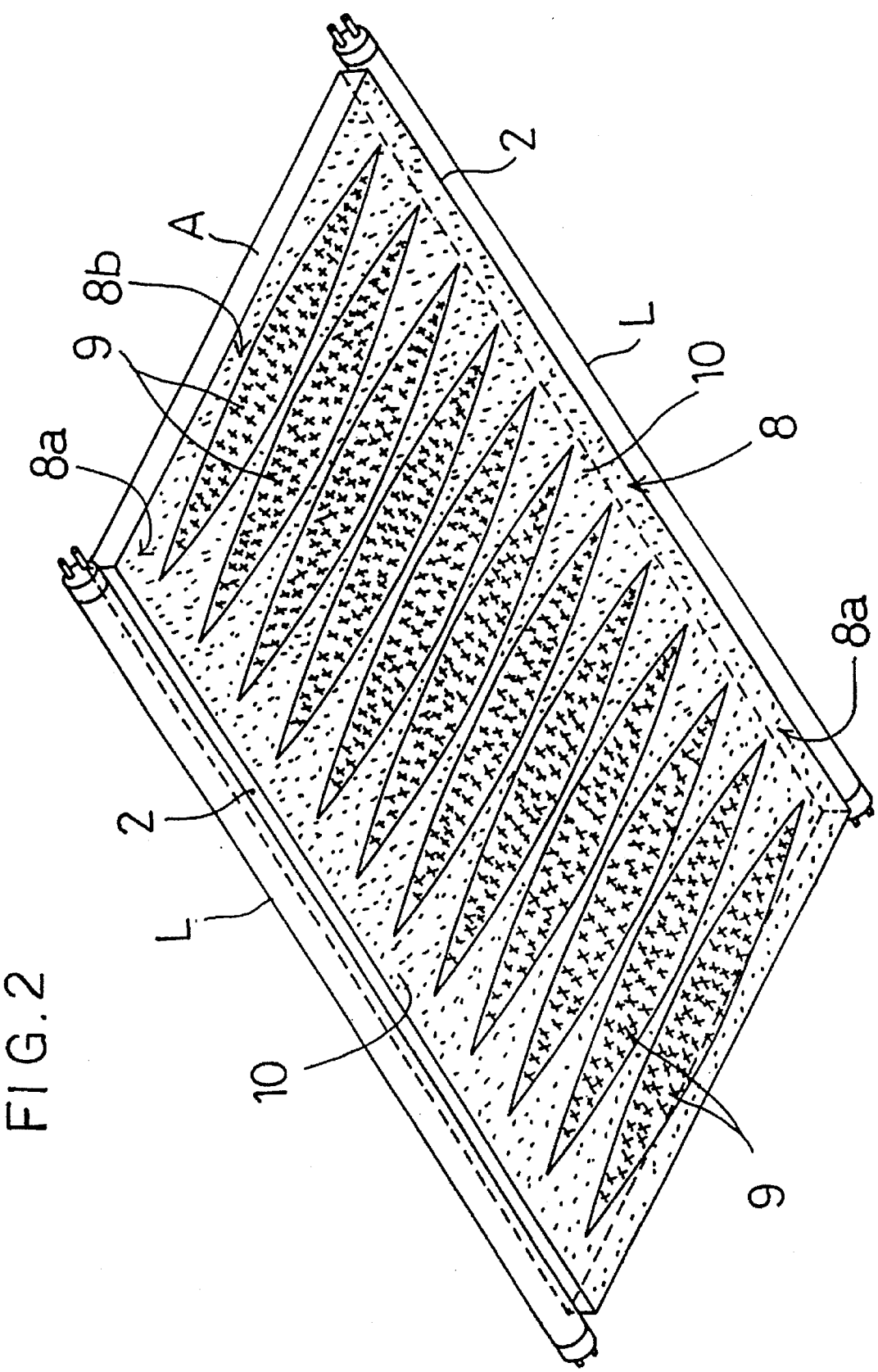
FIG. 2 is a perspective view showing a diffusing plane of a plate mounted in the light box, FIGS. 3 (A) and (B) are sectional views showing a method of forming the diffusing plane.

FIG. 2 shows the fluorescent tubes L and acrylic plate A, with the diffusing plane 8 revealed. The diffusing plane 8 includes a plurality of irregular reflector regions 9 distributed thereon.

The irregular reflector regions 9 comprise ship-shape patterns arranged in juxtaposition. The ship-shape patterns are elongated toward the fluorescent tubes L, and arranged side by side in the longitudinal direction of the fluorescent tubes L substantially throughout the diffusing plane 8.

Thus, the irregular reflector regions 9 are formed such that a greater quantity of light is irregularly reflected in positions 8b remote from the end surfaces 2 than in positions 8a close thereto.

For clarity of illustration, FIG. 2 shows the ship-shape patterns forming the irregular reflector regions 9 as considerably enlarged in relation to the entire illuminating apparatus. In fact, these patterns are formed very narrow, very large in number, and finished with ultra-high precision. The diffusing plane 8 further includes modified irregular reflector regions 10 formed where the irregular reflector regions 9 are absent. The modified irregular reflector regions 10 irregularly reflect a less quantity of light than the irregular reflector regions 9.

In this embodiment, the modified irregular reflector regions 10 fill the entire area of the diffusing plane 8 in which the irregular reflector regions 9 are not formed. The irregular reflector regions 9 and modified irregular reflector regions 10 comprise rugged surfaces formed on the acrylic plate A.

It is also possible to form the irregular reflector regions 9 and modified irregular reflector regions 10 by applying a hypochromatic white ink or milky paint mixed with glass beads or other diffusing materials, to a surface of a plate by a printing technique as described later.

The above-noted rugged surfaces may be formed by various methods such as injection molding, die casting such as solven casting, cutting, etching, electric discharge machining, photographic printing using a photoresist or an ultraviolet hardenable substance, and sand blasting described hereinafter.

In this embodiment, the rugged surfaces are formed as follows. An acrylic plate having smooth surfaces providing almost no irregular reflection (such a plate is readily available in commerce) is cut to size, and the end surfaces 2 are formed to define smooth planes for receiving light from the light sources.

Figure 3:
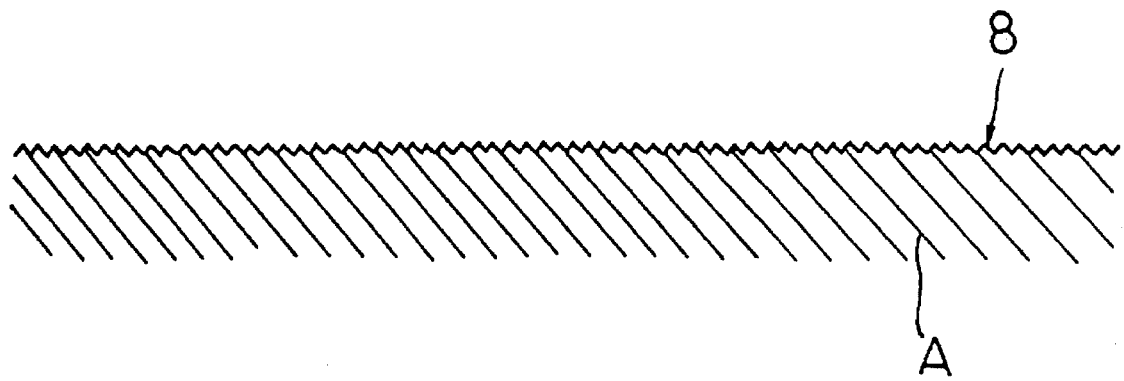
Figure 3:
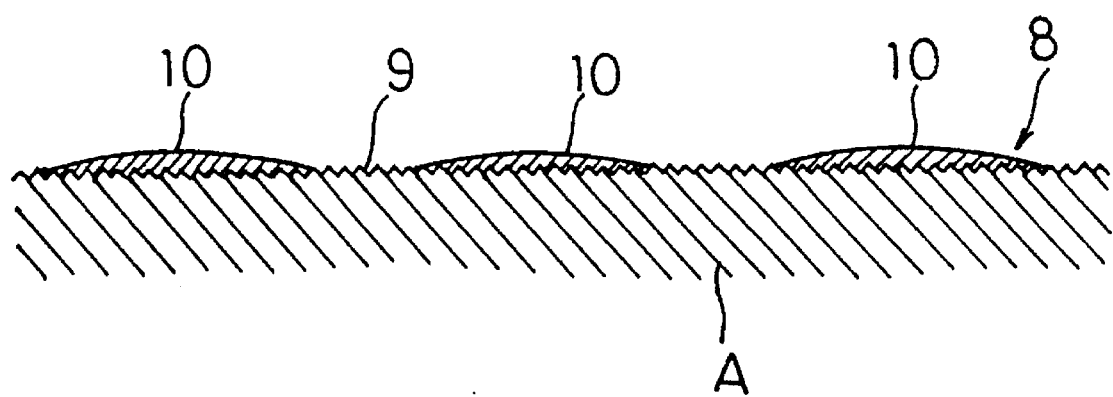

One of the upper and lower surfaces of the acrylic plate A is used to define the diffusing plane 8. First, as shown in FIG. 3(A), a rugged surface is formed over the entire diffusing plane 8 by sand blasting. This rugged surface has a degree of roughness adjustable by selecting size, blasting intensity, blasting time and the like of an abrasive used in the sand blasting.

In fact, what is known as a diffuser plate or diffuser sheet having such a rugged surface already formed is commercially available also. Such a product may be used instead.

Next, as shown in FIG. 3(B), an acrylic transparent ink is applied by silk screen printing technique to portions of the rugged Surface for forming the modified irregular reflector regions 10. This ink forms deposits to limit irregular reflection. The ship-shape patterns shown in FIG. 2 are left free of the ink deposits.

The transparent ink may be applied to the modified irregular reflector regions 10 by other printing techniques than silk screening. For example, a photoresist polymer may be applied in buildup form.

The transparent ink produces the same effect as water adhering to ground glass, to reduce irregular reflection from the rugged surface.

In this embodiment, as noted above, the transparent ink is applied to the modified irregular reflector regions 10 by silk semen printing. The surfaces of the transparent ink deposits have traces left by silk screen meshes, thereby defining rugged surfaces with a certain degree of roughness. In addition, the original, rugged surface lies underneath the ink deposits. The portions of the lower surface 8 of the acrylic plate A to which the transparent ink has been applied, therefore, cause irregular reflection in an appropriate degree, instead of eliminating the irregular reflection altogether. Thus, these portions provide the modified irregular reflector regions 10.

The portions of the rugged surface remaining in the ship-shape patterns, as they are, act as the irregular reflector regions 9.

The quantity of irregular reflection from the modified irregular reflector regions 10 is adjustable by varying the degree of roughness of the transparent ink surfaces or by mixing an irregularly reflecting additive into the transparent ink.

The illuminating apparatus in this embodiment, as constructed above, has shown an improvement in illuminating intensity of about 40–50% over a conventional illuminating apparatus without the modified irregular reflector regions 10. In the conventional illuminating apparatus, the irregular reflector regions distributed over the illuminating plane are clearly discernible in the naked eye. By contrast, the illuminating apparatus in this embodiment provides a substantially uniform intensity of illumination, with no visible variation, throughout the illuminating plane.

The irregular reflector regions 9 are not limited to the ship-shape patterns, but may be in the form of triangles, groups of fines, or dots.

Other embodiments will be described next.

Figure 4:
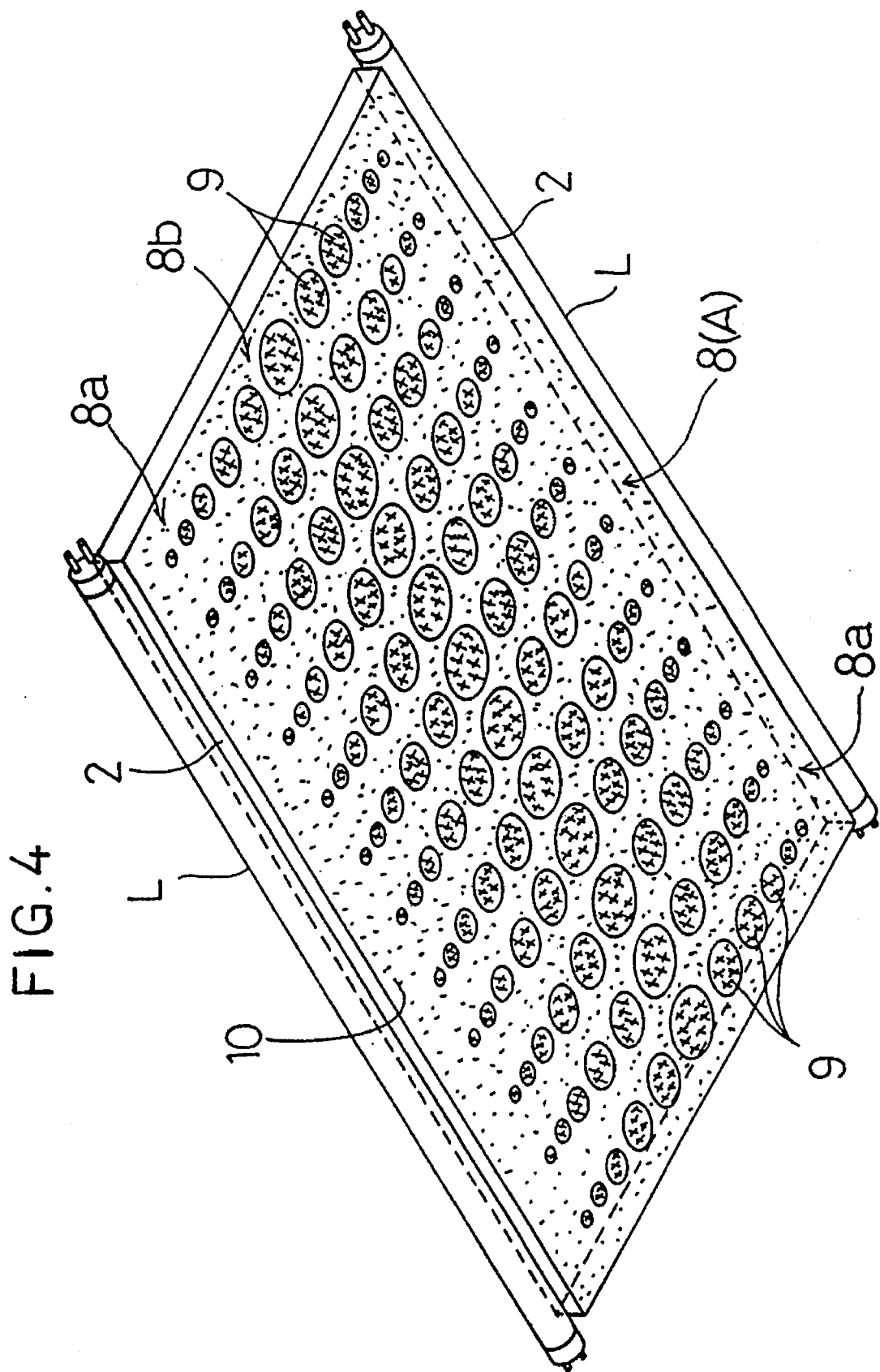
FIG. 4 is a perspective view showing a diffusing plane in another embodiment.
Figure 5:
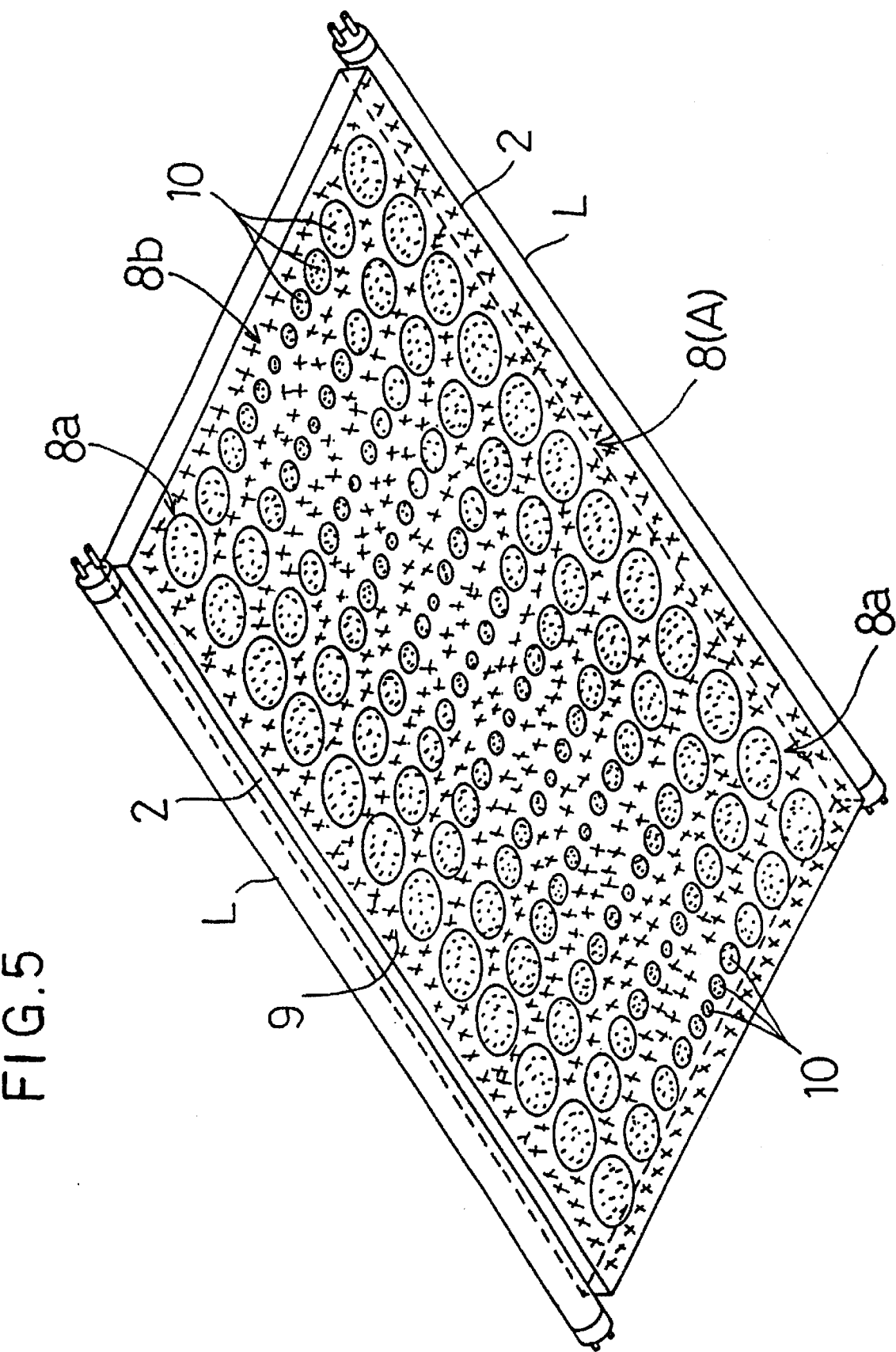
FIG. 5 is a perspective view showing a diffusing plane in a further embodiment, FIG. 6 a fragmentary sectional view of an illuminating apparatus in a still further embodiment, FIG. 7 a fragmentary sectional view of an illuminating apparatus in a still further embodiment, FIG. 8 a fragmentary sectional view of an illuminating apparatus in a still further embodiment.

FIGS. 4 and 5 show reflector regions formed of dot patterns. The diffusing plane 8 shown in FIG. 4 includes irregular reflector regions 9 formed of a plurality of dots having different sizes. These dots are the smaller toward the end surfaces 2 and the larger away therefrom.

The diffusing plane 8 shown in FIG. 5 includes a plurality of dots having different sizes and formed in portions other than the irregular reflector regions 9. These dots provide the modified irregular reflector regions 10, which are the larger toward the end surfaces 2 and the smaller away therefrom.

Thus, the irregular reflector regions 9 in FIGS. 4 and 5 are arranged such that light is irregularly reflected in a greater quantity in positions 8b of the diffusing plane 8 remote from the end surfaces 2 than in positions 8a thereof close to the end surfaces 2.

The irregular reflector regions 9 are not limited to the function to uniform the illuminating intensity on the illuminating plane of the light box, but may be adapted to vary the intensity for certain parts of the illuminating plane.

The modified irregular reflector regions 10 may be formed in only certain of the parts of the diffusing plane 8 where the irregular reflector regions 9 are not formed.

The quantity of irregular reflection from the modified irregular reflector regions 10 need not be uniform through the diffusing plane 8. Plural types of modified irregular reflector regions 10 providing varied quantities of irregular reflection may be distributed over the diffusing plane 8.

The diffusing plane 8 may be formed on each of the upper and lower surfaces of the acrylic plate A.

Figure 6:
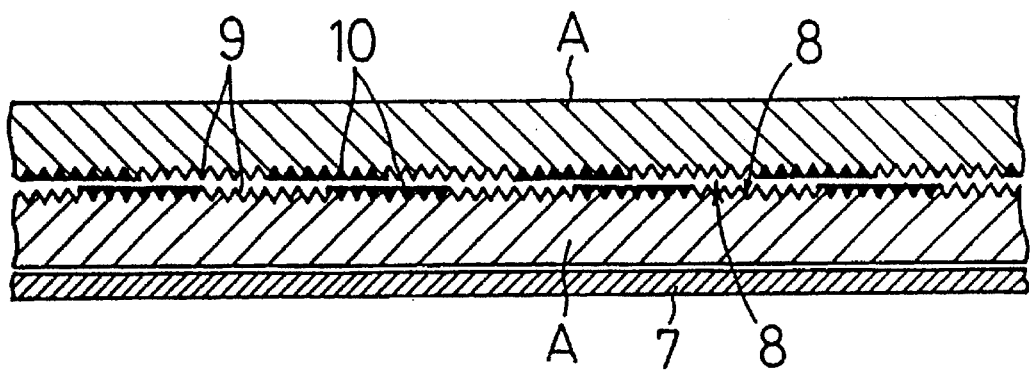
Figure 7:
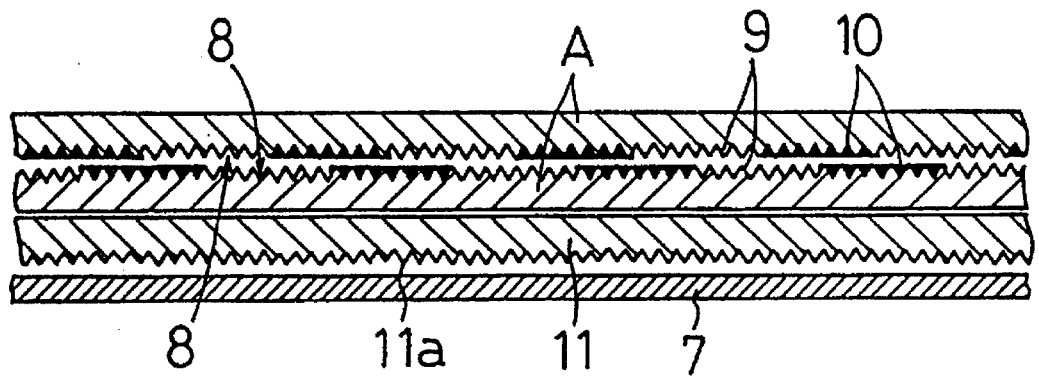
Figure 8:
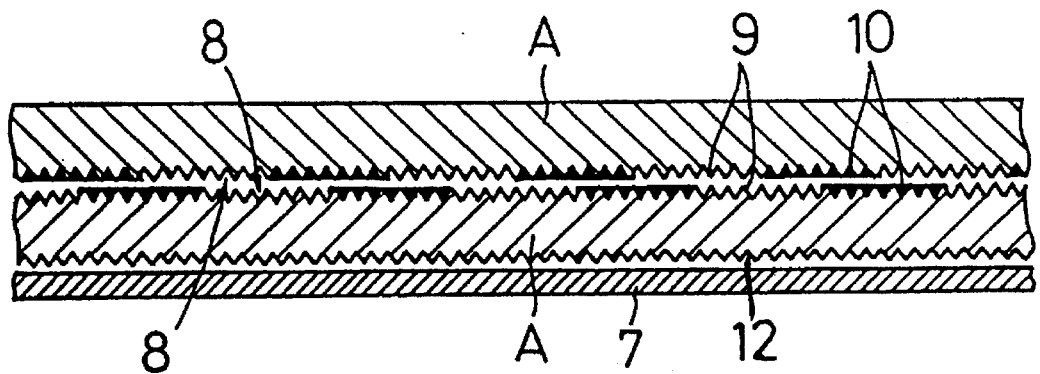

The light box may include a plurality of acrylic plates A as shown in FIGS. 6, 7 and 8.

As shown in FIG. 7, the light box may further include an irregular reflector plate 11 disposed under the acrylic plates A and defining an irregularly reflecting rugged surface 11a.

As shown in FIG. 8, the bottom acrylic plate A may have an upper surface defining the diffusing plane 8 and a lower surface defining an irregularly reflecting rugged surface 12.

The illuminating apparatus is not limited to the ultra-thin light box, but may comprise a backlight apparatus for a display device or for a liquid crystal display of an office automation product, for example.

Figure 9:
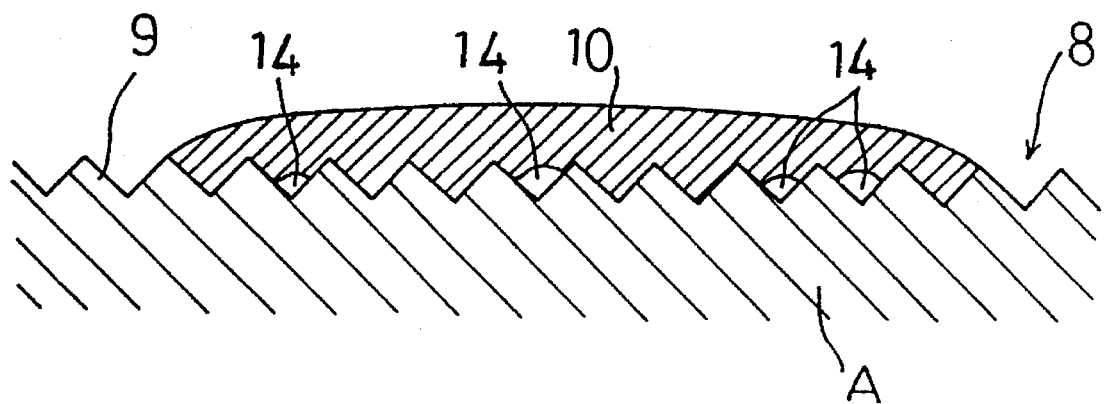
FIG. 9 is an enlarged view showing a deposit on a plate in a still further embodiment.
Figure 10:
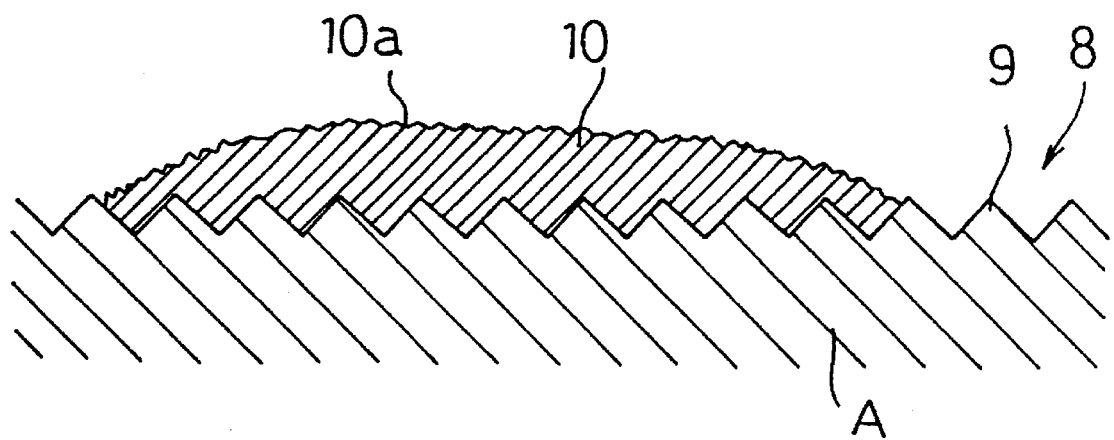
FIG. 10 is an enlarged view showing a deposit on a plate in a still further embodiment.
Figure 11:
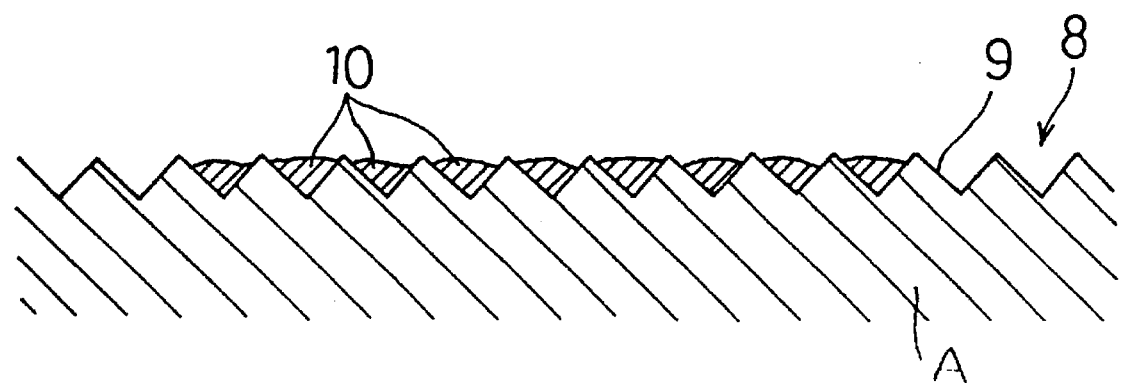
FIG. 11 is an enlarged view showing a deposit on a plate in a still further embodiment.
Figure 12:
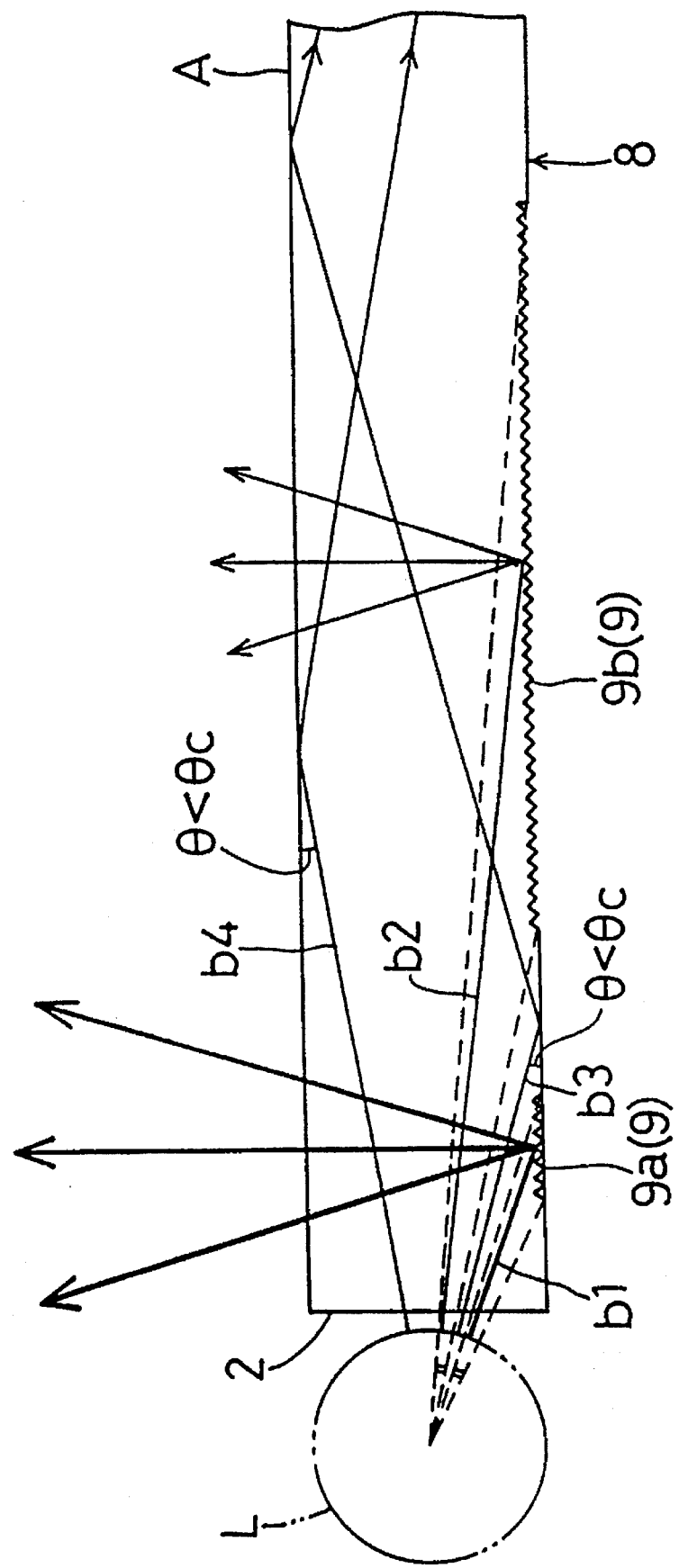
FIG. 12 is a schematic view showing functions of a diffusing plane of a plate.
Figure 13:
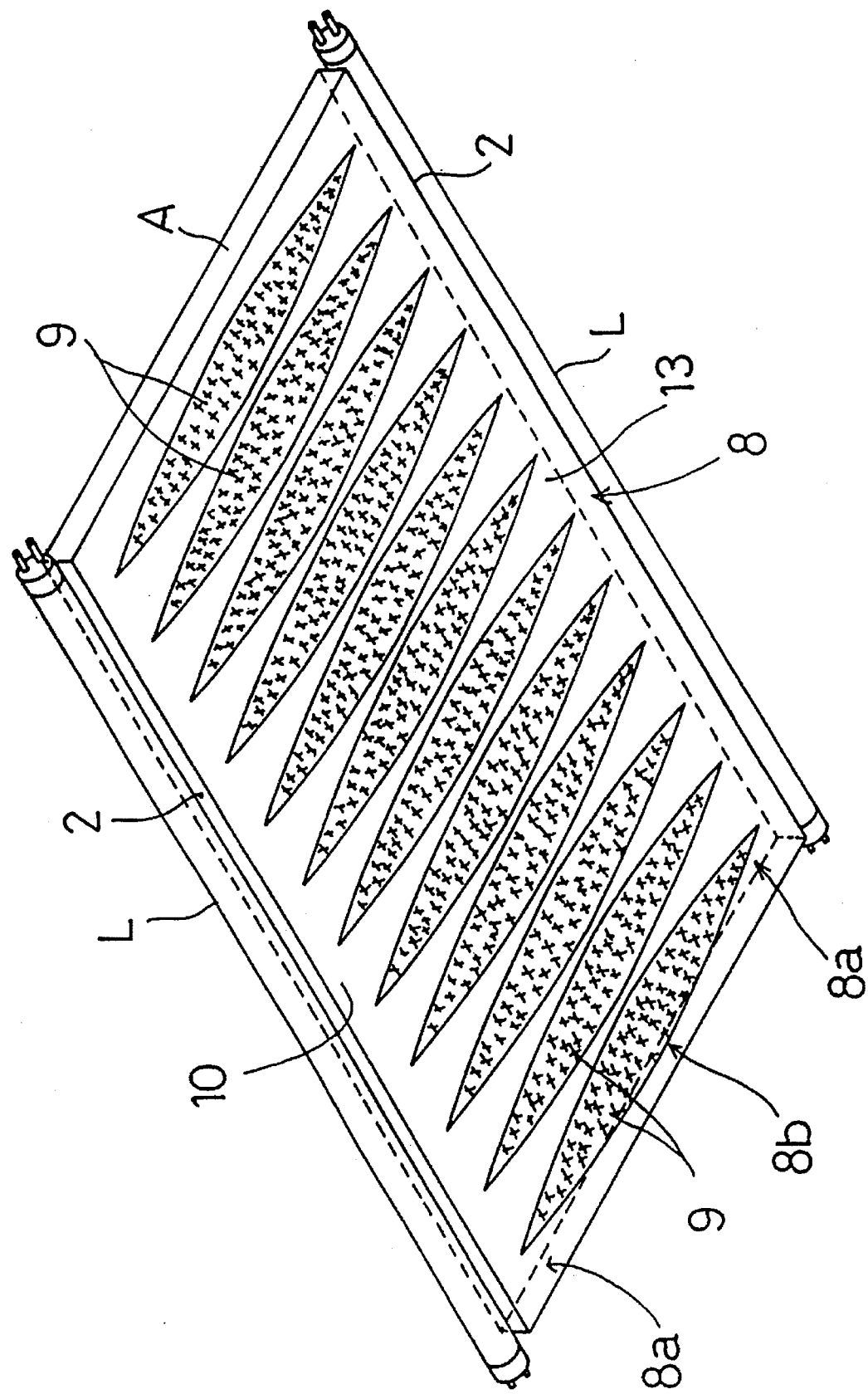
FIG. 13 is a perspective view showing a diffusing plane of a conventional apparatus.

FIGS. 9, 10 and 11 show, in enlargement, the modified irregular reflector regions 10 having transparent ink deposits. As shown in FIG. 9, the modified irregular reflector regions 10 may include bubbles 14 formed in recesses of the rugged surface as a result of incomplete filling with the transparent ink.

As shown in FIG. 10, the modified irregular reflector regions 10 may have rugged surfaces 10a formed by deposits to produce irregular reflection.

As shown in FIG. 11, the modified irregular reflector regions 10 may be formed of a thin layer of transparent ink through which ridges of the rugged surface project to a certain extent.

The deposits defining the modified irregular reflector regions 10 may be formed of any other material than the acrylic transparent ink, as long as it is effective to reduce irregular reflection. For example, a material in sheet form may be used, or a chemical may be used to dissolve the ridges of the rugged surface for smoothness.

The method of forming the modified irregular reflector regions 10 is not limited to the uniform application of transparent ink to the lower surface 8. The type of ink, the method or mode of application may be varied as appropriate, to form plural types of modified irregular reflector regions having different quantities of irregular reflection and distributed over the lower surface 8.

As noted in the first embodiment, the irregular reflector regions 9 are not limited to the ship-shape patterns, but may be in the form of triangles, groups of lines, or dots.

The plate of transparent or semitransparent optical medium is not limited to the acrylic plate A. Glass or various plastics (e.g. polyethylene, polyester and epoxy resin) may be employed instead.

What is claimed is:

1. A method of manufacturing an edge light conductor comprising the steps of:

shaping at least one of front and back surfaces of a plate of transparent or semitransparent optical medium to be a substantially uniform rugged surface substantially throughout an entirety thereof, said rugged forming irregular reflection of light; and forming modified irregular reflector regions by applying deposits to part of said rugged surface wherein said modified irregular reflector regions comprise means for limiting a quantity of said irregular reflection from the area of said deposits.

2. A method as defined in claim 1, wherein said rugged surface is formed by sand blasting.

3. A method as defined in claim 2, wherein said modified irregular reflector regions are formed by applying transparent ink in a printing process to form said deposits.

4. A method as defined in claim 3, wherein said modified irregular reflector regions are formed of said deposits to have rugged surfaces to produce an effect of irregular reflection.

5. A method as defined in claim 3, wherein bubbles are mixed into said modified irregular reflector regions as a result of said transparent ink incompletely extending into recesses of said rugged surface.

6. A method as defined in claim 3, wherein said modified irregular reflector regions are formed by applying said transparent ink in a thin layer through which ridges of said rugged surface project to a certain extent.

7. A method Of making an edge light conductor comprising the steps of:

forming a substantially uniformly rugged surface over the entirety of a diffusing plane of an optical medium, said rugged surface forming irregular reflection of light;

applying deposits on said rugged surface to form modified irregular reflector regions, wherein said modified irregular reflector regions comprise means for limiting a quantity of said irregular reflection from the area of said deposits.

8. The method as claimed in claim 7, wherein said substantially uniformly rugged surface is formed by sand blasting.

9. The method as claimed in claim 7, wherein said modified irregular reflector regions are formed by applying ink in a printing process.

10. The method as claimed in claim 7, wherein said modified irregular reflector regions are formed to have a substantially rough surface.

11. The method as claimed in claim 9, further including the step of varying a quantity of irregular light reflection from said modified irregular reflector regions by mixing an irregularly reflecting additive into said ink.

12. The method as claimed in claim 7, further including the step of arranging said modified irregular reflector regions such that a greater quantity of light is irregularly reflected in portions of said diffusing plane remote from end surfaces of said optical medium.

13. The method as claimed in claim 7, further including the step of forming said modified irregular reflector regions on said diffusing plane such that ridges of said rugged surface project through said modified irregular reflector regions.

14. The method as claimed in claim 7, further including the step of varying a quantity of irregular reflection from said diffusing plane by distributing a plurality of types of modified reflector regions over said diffusing plane.

15. The method as claimed in claim 7, further including the step of placing light sources opposed to end surfaces of said optical medium for introducing light inwardly of said optical medium through said end surfaces.

16. A method of manufacturing an edge light conductor comprising the steps of:

sand blasting at least one of front and back surfaces of a plate of transparent or semitransparent optical medium to be a substantially uniform rugged surface substantially throughout an entirety thereof; and forming modified irregular reflector regions by applying deposits of said rugged surface to limit a quantity of irregular reflection, wherein said deposits are formed by applying transparent ink in a printing process in a thin layer through which ridges of said rugged surface project to a certain extent.

17. A method of making an edge light conductor comprising the steps of:

forming a substantially uniformly rugged surface on a diffusing plane of an optical medium;

applying deposits on said rugged surface to form modified irregular reflector regions to limit a quantity of irregular reflection, wherein ridges of said rugged surface project through said modified irregular reflector regions.

\* \* \* \* \*